(12) United States Patent
Kurashina et al.

(10) Patent No.: US 8,541,742 B2
(45) Date of Patent: Sep. 24, 2013

(54) BOLOMETER-TYPE THZ WAVE DETECTOR

(75) Inventors: Seiji Kurashina, Tokyo (JP); Masaru Miyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/422,120

(22) Filed: Mar. 16, 2012

(65) Prior Publication Data

US 2012/0235045 A1    Sep. 20, 2012

(30) Foreign Application Priority Data

Mar. 17, 2011    (JP) .................................. 2011-058693

(51) Int. Cl.
*G01J 5/20*    (2006.01)

(52) U.S. Cl.
USPC ...................................................... 250/338.4

(58) Field of Classification Search
USPC ........... 250/338.1, 338.4, 339.02, 340, 341.1, 250/353
See application file for complete search history.

(56) References Cited

U.S. PATENT DOCUMENTS

2008/0237467 A1 * 10/2008 Oda et al. .................... 250/338.3

* cited by examiner

*Primary Examiner* — Mark R Gaworecki (57) ABSTRACT

The bolometer-type THz wave detector according to the present invention has a thermal isolation structure in which a temperature detecting portion including a bolometer thin film connected to electrical wirings is supported in a state of being raised from the substrate by a supporting portion including the electrical wirings connected to a Read-out integrated circuit formed in a substrate, and the detector comprises a reflective film formed on the substrate, an absorbing film formed on the front surface or back surface or at an inner position in the temperature detecting portion, whereby an optical resonant structure is formed by the reflective film and the absorbing film, and a dielectric film formed on the reflective film. The dielectric film thickness f is set so that air gap between an upper surface of the dielectric film and a lower surface of the temperature detecting portion is smaller than 8 μm.

6 Claims, 10 Drawing Sheets

1 Bolometer-type THz wave detector

1 Bolometer-type THz wave detector

BOLOMETER-TYPE THZ WAVE DETECTOR

TECHNICAL FIELD

The present invention relates to a detector that detects electromagnetic waves in a THz frequency band (THz waves) and, more particularly, to a bolometer-type THz wave detector.

BACKGROUND ART

In recent years, electromagnetic waves in a terahertz frequency band intermediate between radio waves and light (i.e., electromagnetic waves having a frequency of $10^{12}$ Hz range and a wavelength ranging about 30 μm to 1 mm, hereinafter referred to as "THz wave") have been attracting attention as electromagnetic waves that directly reflect information from substances. Techniques relating to bolometer-type infrared light detectors having a thermal isolation structure have been applied to detection of THz waves. Conventional detectors of such a kind include bolometer-type THz wave detectors, which are, for example, disclosed in JP 2008-241438 A and in a technical paper published in SPIE (Oda et al., Proceedings of SPIE, Vol. 6940 (2008) p. 69402Y-1-69402Y-12).

Figure 8:
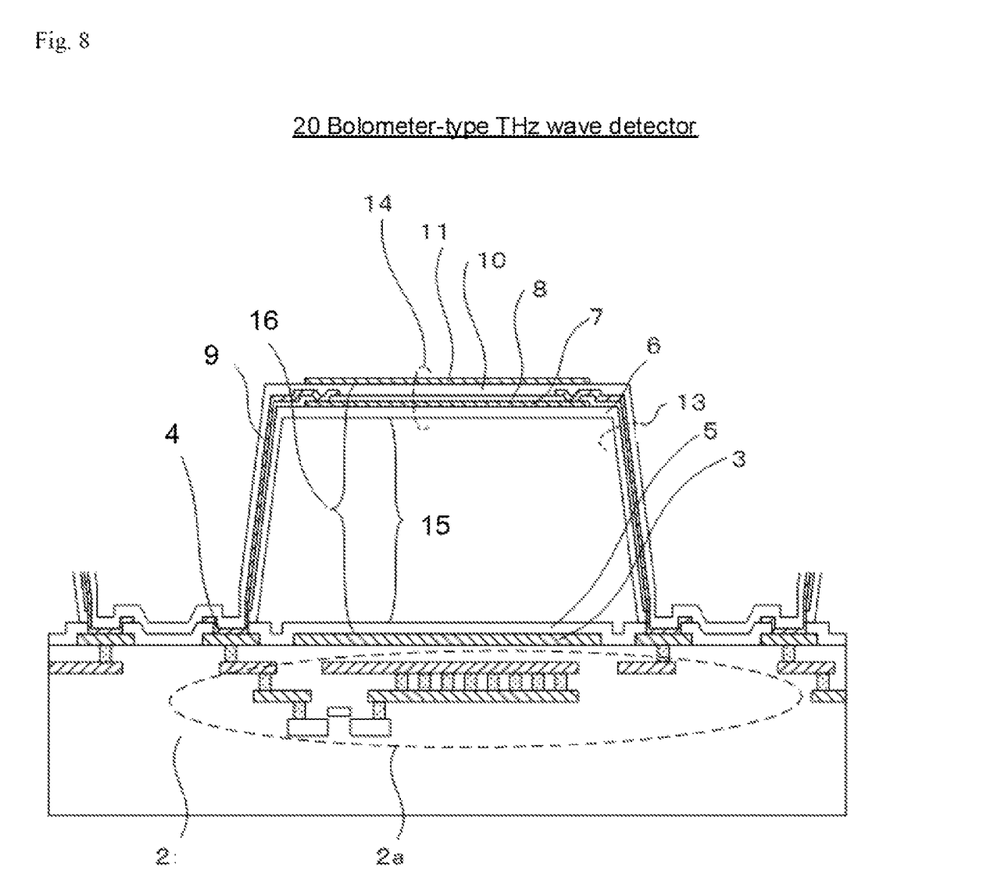
FIG. 8 is a sectional view schematically showing a pixel structure of a conventional pixel structure of a bolometer-type THz wave detector.

FIG. 8 shows a pixel structure of a conventional two-dimensional bolometer-type THz wave detector. In the bolometer-type THz wave detector 20 shown in FIG. 8, a reflective film 3 that reflects incident THz waves and contacts 4 for connection to a Read-out integrated circuit 2a or the like are formed on a circuit substrate 2 in which the Read-out integrated circuit 2a is formed. A first protecting film 5 is formed on the reflective film 3 and the contacts 4. A supporting portion 13 composed of a second protecting film 6, a third protecting film 8, electrode wiring 9 and a fourth protecting film 10 is formed on the contacts 4. The Read-out integrated circuit 2a and the electrode wiring 9 are connected to each other through the contacts 4. The supporting portion 13 holds a temperature detecting portion (diaphragm) 14 composed of the second protecting, film 6, a bolometer thin film 7, the third protecting film 8, the fourth protecting film 10 and an absorbing film 11 in a hollow space (air gap 15). The electrode wirings 9 are connected to both ends of the bolometer thin film 7.

PRIOR ART DOCUMENTS

Patent Document

[Patent Document 1] JP 2008-241438 A

Non-Patent Document

[Non-Patent Document 1] Oda et al., Proceedings of SPIE, Vol. 6940 (2008) p. 69402Y-1-69402Y-12

DISCLOSURE OF THE INVENTION

Problems to be Solved by the Invention

In the case of the conventional art, for example, the bolometer-type THz wave detector disclosed in the prior application filed by the applicant of the present application (Japanese Patent Application No. 2009-258923; JP 2011-106825 A) is characterized by setting the air gap 15 to 8 to 14 μm in the pixel structure shown in FIG. 8 (corresponding to that disclosed in FIG. 2 of JP 2011-106825 A). In general, when taking account of the absorbing structure using optical interference, it is preferable to set the air gap 15 to ¼ of the wavelength λ to be detected.

However, as a result of studying about detectors with such increased air gap as suggested in the conventional art, it has been found out that cracks happen to occur in the temperature detecting portion 14, which are induced by the influence of, for example, a heat treatment in the manufacturing process, and that such a portion with the crack becomes a defective pixel, which causes a reduction in manufacturing yield.

Figure 9:
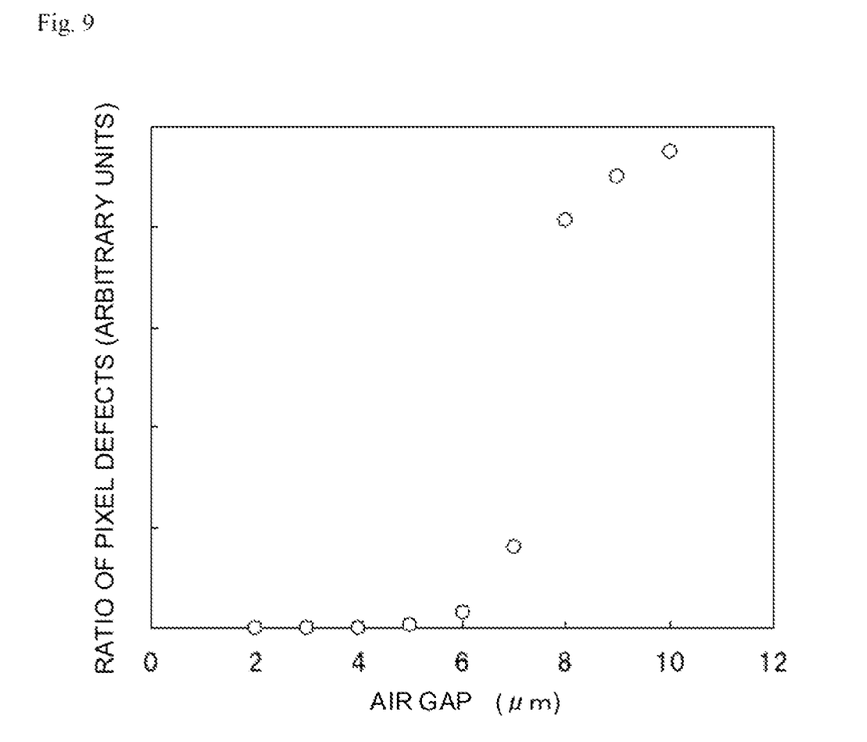
FIG. 9 is a diagram showing the relationship between the air gap and the number of pixel defects that is observed in the case when the detector having the conventional pixel structure is manufactured.

The frequency of occurrence of cracks in the temperature detecting portion 14 described above depends on the difference in thermal expansion coefficient between a material used for a sacrificial layer (which is used for holding the temperature detecting portion 14 in the manufacturing process, not shown in FIG. 8, as it is eventually removed out) and the second protecting film 6, the third protecting film 8 and the fourth protecting film 10 that are main constituent elements of the temperature detecting portion 14. In the case if the thickness of the sacrificial layer is increased (the air gap is increased) as shown in FIG. 9, the frequency of occurrence of cracks is increased (the number of defective pixels is increased).

In view of the above-described problems, the present invention is conceived as approach to solve them, and thus, a primary object of the present invention is to provide a bolometer-type THz wave detector having high-sensitivity, whose structure is capable of being manufactured with a high manufacturing yield.

Means for Solving the Problem

A bolometer-type THz wave detector that the present invention provides in order to achieve the above-described object is:

a bolometer-type THz wave detector having a thermal isolation structure in which a temperature detecting portion including a bolometer thin film that is connected to electrical wirings is supported in a state of being raised from a substrate by a supporting portion including the electrical wirings to be connected to a Read-out integrated circuit formed in the substrate, characterized in that:

the wave detector comprising a reflective film for reflecting THz waves that is formed in such a position as to be opposed to the temperature detecting portion on the substrate, an absorbing film for absorbing the THz waves that is formed on the front surface or the back surface of the temperature detecting portion or at an inner position in the temperature detecting portion, whereby an optical resonant structure formed by the reflective film and the temperature detecting portion, and a film of dielectric transparent to the THz waves that is formed on the reflective film, wherein the film thickness of the dielectric is set so that the distance between an upper surface of the dielectric film and a lower surface of the temperature detecting portion is smaller than 8 μm.

Effects of the Invention

In the bolometer-type THz wave detector according to the present invention, the film thickness of the dielectric formed on the reflective film is increased in trading off for reducing an air gap (the distance by which the temperature detecting portion is raised so that a hollow space is formed, $\Delta h_{air\text{-}gap}$) (preferably, to a value smaller than 8 μm). Accordingly, absorption of electromagnetic waves in the THz band with efficiency is enabled by suitably setting a gap (the distance by which an optical resonant structure is formed). Also, the frequency of occurrence of cracks in the temperature detecting portion 14, which is a problem to be solved in the process for manufacturing, can be reduced by reducing the air gap. The bolometer-type THz wave detector of the present invention can therefore be manufactured with a high yield.

Needless to say, the upper limit of the air gap ($\Delta h_{air-gap}$) may change depending on the difference between the thermal expansion coefficients of the material of a sacrificial layer used in the manufacturing process and the material used for the temperature detecting portion, which is not described in detail.

DESCRIPTION OF SYMBOLS

In the aforementioned drawings, reference symbols described below have the following meanings.
1 Bolometer-type THz wave detector
2 Circuit substrate
2a Read-out integrated circuit
3 Reflective film
4 Contact
5 First protecting film
6 Second protecting film
7 Bolometer thin film
8 Third protecting film
9 Electrode wiring
10 Fourth protecting film
11 Absorbing film
12 Eave-like member
13 Supporting portion
14 Temperature detecting portion (diaphragm)
15 Air gap
16 Gap
17 Through hole
21 Interlayer dielectric film
20 Conventional bolometer-type THz wave detector

[Best Mode for Carrying Out the Invention]

In designing in a bolometer-type THz wave detector an absorbing structure using optical interference, e.g., the structure shown in FIG. 8 in which the gap ($\Delta h_{gap}$) and the air gap ($\Delta h_{air-gap}$) are substantially equal to each other, it is preferable to set the air gap ($\Delta h_{air-gap}$) to ¼ of the wavelength λ to be detected and the air gap is set, for example, to 8 to 14 μm, as described with respect to the background art. In this setting, if the air gap ($\Delta h_{air-gap}$) is increased, a problem arises that cracks occur in a temperature detecting portion due to the influence of, for example, a heat treatment in the manufacturing process, and cause production of a defective pixel and a reduction in manufacturing yield.

Then, in one embodiment of the present invention, in a structure including a thermal isolation structure in which a temperature detecting portion including a bolometer thin film connected to electrical wiring connected to a Read-out integrated circuit formed on a substrate is supported in a state of being raised from the substrate by a supporting portion including the electrical wiring, a reflective film that reflects THz waves, and that is formed in such a position as to be opposed to the temperature detecting portion on the substrate, an absorbing film that absorbs THz waves, and that is formed on the front surface or the back surface of the temperature detecting portion or at an inner position in the temperature detecting portion, an optical resonant structure formed by the reflective film and the absorbing film, and a film of dielectric transparent to THz waves and formed on the reflective film, the film thickness of the dielectric is set so that the distance between the upper surface of the dielectric film and the lower surface of the temperature detecting portion is smaller than 8 μm.

In this way, the air gap can be reduced in comparison with that in the conventional structure, thereby reducing the occurrence of defective pixels due to, for example, a heat treatment and improving the manufacturing yield.

A mode in which the air gap ($\Delta h_{air-gap}$) set in a range below 8 μm corresponds to ¼ of the wavelength λ to be detected is also included in the technical scope of the present invention. This mode, however, departs from the preferred mode. In the present invention, it is preferable to select a mode in which the air gap ($\Delta h_{air-gap}$), set in a range below 8 μm, is significantly smaller than ¼ of the wavelength λ to be detected. In the present invention, it is generally preferable to select a mode in which the air gap ($\Delta h_{air-gap}$), set in a range below 8 μm, is smaller by at least 1 μm, more preferably by at least 2 μm than ¼ of the wavelength λ to be detected.

On the other hand, in some case where a mode in which the air gap ($\Delta h_{air-gap}$), set in a range below 8 μm, is $\Delta h_{air-gap}=0$ μm or smaller than 1 μm ($0<\Delta h_{air-gap}<1$ μm) is selected, the technical feature of the thermal isolation structure using the air gap is not sufficiently reflected. In general, in the present invention, it is desirable to select a mode in which the air gap ($\Delta h_{air-gap}$), set in a range below 8 μm, is at least 1 μm (1 μm<$\Delta h_{air-gap}$<8 μm).

[First Embodiment]

Figure 1:
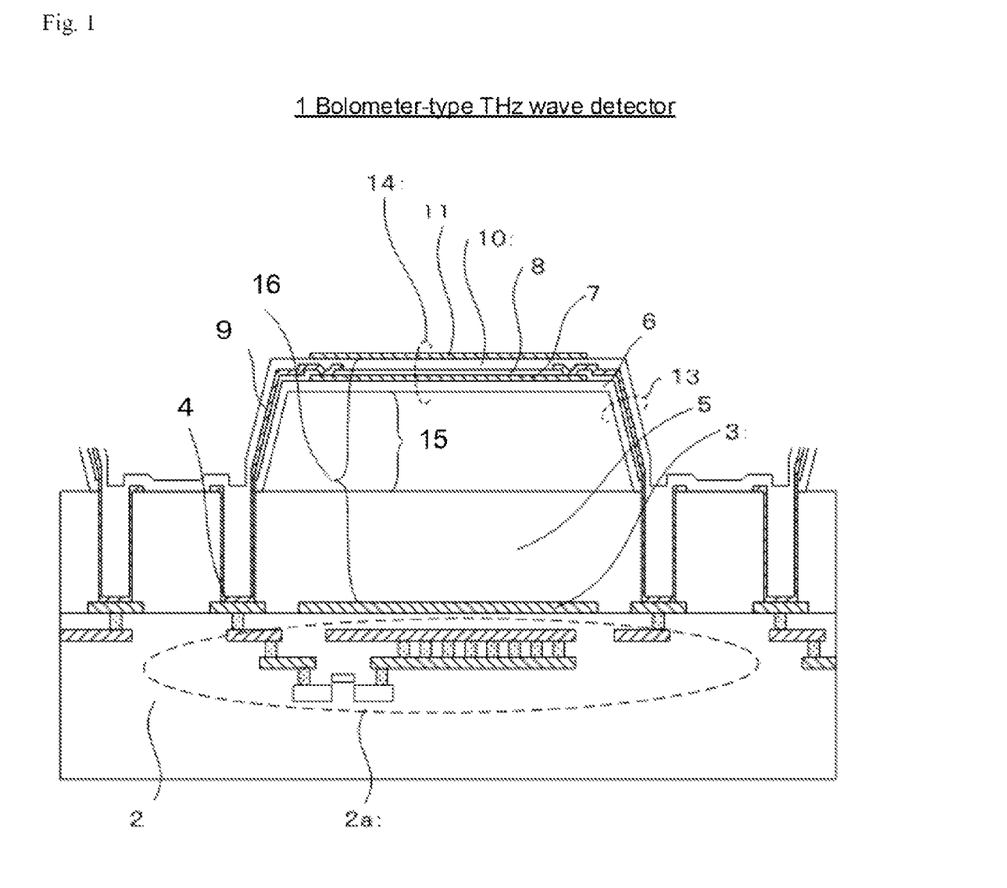
FIG. 1 is a sectional view schematically showing a pixel structure of a bolometer-type THz wave detector according to a first embodiment of the present invention.
Figure 2:
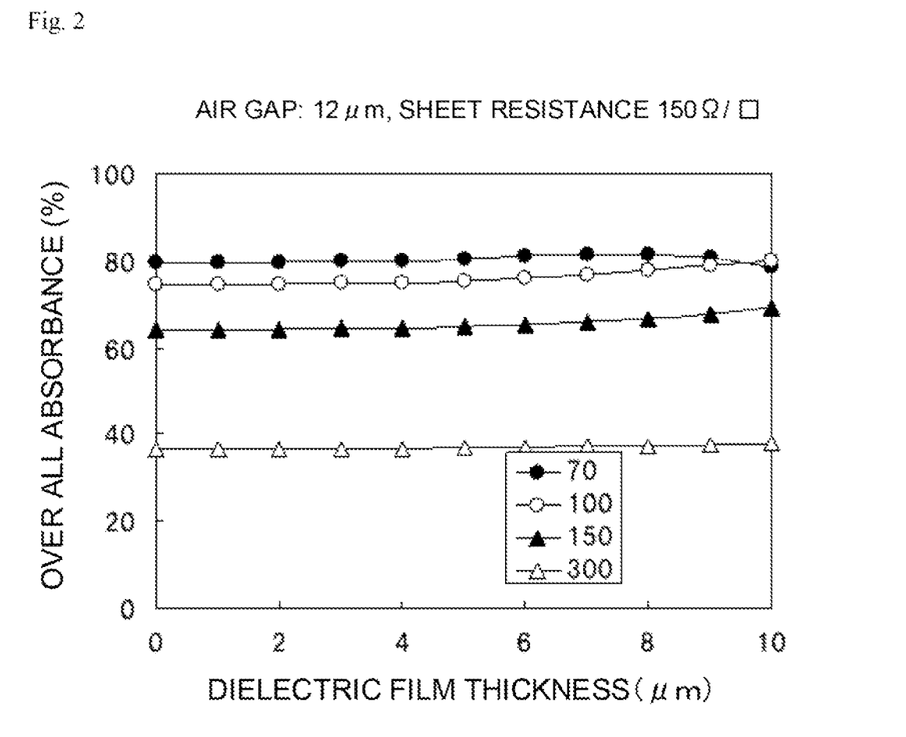
FIG. 2 is a diagram showing the dielectric film thickness dependency of the absorbance when the gap is set at 12 μm.
Figure 10:
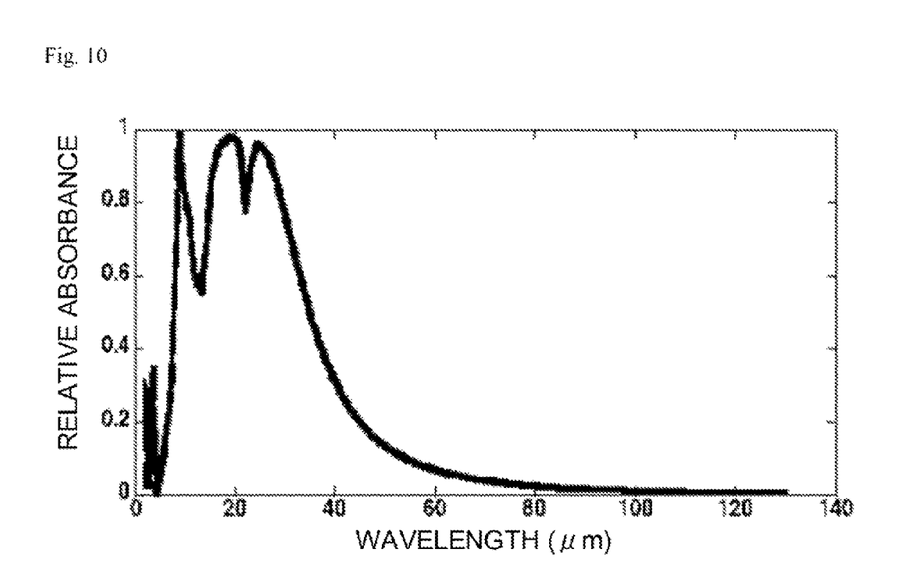
FIG. 10 is a spectrum showing an absorption property of silicon nitride.

To describe the above-described embodiment in more detail, a bolometer-type THz wave detector according to a first embodiment of the present invention will be explained with reference to FIGS. 1, 2, and 10. FIG. 1 is a diagram showing a pixel structure of the bolometer-type THz wave detector according to the first embodiment of the present invention. FIG. 2 is a diagram showing the relationship between the dielectric film thickness ($t_{dielectric}$) and the absorbance when the gap is 12 μm. FIG. 10 is a diagram showing a spectrum of absorbing property of silicon nitride.

As shown in FIG. 1, in a bolometer-type THz wave detector 1 according to the first embodiment of the present invention, a reflective film 3 that reflects incident THz waves and contacts 4 for connection to a Read-out integrated circuit 2a or the like are formed on a circuit substrate 2 where the Read-out integrated circuit 2a is formed. A first protecting film 5 is formed on the reflective film 3 and the contacts 4. A supporting portion 13 formed of a second protecting film 6, a third protecting film 8, electrode wiring 9 and a fourth protecting film 10 is formed on the contacts 4. The Read-out integrated circuit 2a and the electrode wiring 9 are connected to each other through the contacts 4. The supporting portion 13 holds a temperature detecting portion (diaphragm) 14 formed of the second protecting film 6, a bolometer thin film 7, the third protecting film 8, the fourth protecting film 10 and an absorbing film 11 in a hollow space (air gap 15) The electrode wiring 9 is connected to opposite ends of the bolometer thin film 7.

As described above, there is a need to suitably set the condition (the distance between the absorbing film 11 and the reflective film 3, i.e., a gap 16 ($\Delta h_{gap}$)) for the optical resonant structure in order to effectively absorb THz waves. If the air gap ($\Delta h_{air-gap}$) is increased, a problem arises that cracks occur in the temperature detecting portion due to the influence of, for example, a heat treatment in the manufacturing process, which causes occurrence of a defective pixel and a reduction in manufacturing yield. In the first embodiment of the present invention, therefore, the film thickness ($t_{1st-protecting-film}$) of the first protecting film 5 is increased to enable the air gap 15 to be reduced while the gap 16 ($\Delta h_{gap}$) is set to such a value that THz waves can be efficiently absorbed.

FIG. 2 shows an example of results of computation of the over-all absorbance when the sheet resistance ($R_{sheet}$) of the absorbing film 11 is set to 150 Ω/square; the gap 16 ($\Delta h_{gap}$), to 12 μm; and the dielectric film thickness ($t_{dielectric}$) (the film thickness ($t_{1st-protecting-film}$) of the first protecting film 5 in FIGS. 1), to 0 to 10 μm. In the example of computation, the wavelength λ to be detected is assumed to be 70, 100, 150, 300 μm, and the refractive index n of the dielectric is assumed to be 2. The dielectric film thickness 0 μm is the same as that in the case where the air gap 15 ($\Delta h_{air-gap}$) is set to 12 μm in the bolometer-type THz wave detector as an example of the conventional art shown in FIG. 8.

As is apparent from FIG. 2, the absorbance tends to be improved with increase in dielectric film thickness ($t_{dielectric}$), In the example of computation, the absorbance, dependent on the wavelength λ to be detected and the dielectric film thickness ($t_{dielectric}$) as well, is improved by 7% at the maximum relative to that in the example of the conventional art (dielectric film thickness 0 μm). Suitable values of the sheet resistance ($R_{sheet}$), the gap 16 ($\Delta h_{gap}$) and the dielectric film thickness ($t_{dielectric}$) (the film thickness of the first protecting film 5 ($t_{1st-protecting-film}$) in FIG. 1) can be respectively obtained by computation.

The absorbance of silicon nitride has been reported in the literature published by Q. Hu et al. ("Real-time THz Imaging Using Quantum-cascade Lasers and Focal-plane Array Cameras", 2nd International Workshop on Quantum Cascade Lasers, Sep. 6-9 (2006)). FIG. 10 shows the absorbance of silicon nitride reported therein. As shown in FIG. 10, silicon nitride is substantially transparent when the wavelength λ is 50 μm or longer. In the case where the first protecting film 5 is formed of silicon nitride, therefore, it is necessary to take into consideration the fact that when the wavelength λ is in the region below 50 μm, the sensitivity is considerably reduced because of absorption of incident energy in the first protecting film 5.

Thus, there is a need to comprehensively consider the over-all absorbance shown in FIG. 2, absorption in the dielectric film (the first protecting film 5) and a reduction in yield due to an increase in size of the air gap 15 in the case when setting the air gap 15 ($\Delta h_{air-gap}$). Since the number of defective pixels abruptly increases when the air gap is 8 μm or more as shown in FIG. 9, it can be said that the air gap 15 ($\Delta h_{air-gap}$) in the range below 8 μm (more preferably, 7 μm or thinner) is suitable.

An example of a process for manufacturing the bolometer-type THz wave detector 1 having the structure as shown in FIG. 1 will be outlined below.

First, film of a metal such as Al, Ti or the like is formed by sputtering on the circuit substrate 2 where the Read-out integrated circuit 2, which is, for example, a CMOS circuit, is formed, and patterning thereof by using a resist as a mask is performed to form the reflective film 3 for reflecting THz waves incident on the temperature detecting portion 14 for each pixel, the electrode wirings 9 and the contacts 4 for connection to the Read-out integrated circuit 2a. The metal used for forming the reflective film 3 is not limited to Al or Ti. A different material having a high reflectivity to THz waves (the reflectivity: R(λ) at the wavelength λ) and low electrical resistivity (ρ) may alternatively be used therefor.

Next, silicon oxide film (SiO, $SiO_2$), silicon nitride film (SiN, $Si_3N_4$), silicon oxynitride film (SiON) or the like is deposited by plasma CVD on the entire surface of the circuit substrate 2, thereby forming the first protecting film 5 for protecting the reflective film 3 and the contacts 4. The film thickness ($t_{1st-protecting-film}$) of the first protecting film 5 is set so that the gap 16 (the distance ($\Delta h_{gap}$) between the reflective film 3 and the absorbing film 11) has such a value that THz waves can be efficiently absorbed, and so that the air gap 15 (the distance by which the temperature detecting portion 14 is raised so that a hollow space is formed, i.e., the distance ($\Delta h_{air-gap}$) between the upper surface of the first protecting film 5 and the lower surface of the temperature detecting portion 14) is smaller than 8 μm.

Next, an organic film such as photosensitive polyimide film is formed by application on the entire surface of the circuit substrate 2 and exposure and development are performed so that regions between the contacts 4 and the pixel area are exposed, followed by baking for curing at about 400° C. A sacrificial layer for forming the micro-bridge structure is formed thereby. In the step, the thickness of the photosensitive polyimide film after curing is set to such a value that the air gap 15 ($\Delta h_{air-gap}$) is made smaller than 8 μm.

Next, silicon oxide film (SiO, $SiO_2$), silicon nitride film (SiN, $Si_3N_4$), silicon oxynitride film (SiON) or the like is deposited by plasma CVD on the sacrificial layer, thereby forming the second protecting film 6.

Next, vanadium oxide ($V_2O_3$, $VO_x$), titanium oxide ($TiO_x$) or the like is deposited on the second protecting film 6 by reactive sputtering in an oxygen atmosphere, and patterning by using a resist as a mask is performed to form the bolometer thin film 7 in the portion to be formed as the temperature detecting portion 14. While vanadium oxide, titanium oxide or the like is used as the bolometer thin film 7 in this mode, some other material having a high temperature coefficient resistance (TCR) may alternatively be used therefor.

Next, silicon oxide film (SiO, $SiO_2$), silicon nitride film (SiN, $Si_3N_4$), silicon oxynitride film (SiON) or the like is deposited by plasma CVD to form the third protecting film 8 for protecting the bolometer thin film 7. Thereafter, the first protecting film 5, the second protecting film 6 and the third protecting film 8 which cover just on the contacts 4 and the third protecting film 8 which covers just on end portions of the bolometer thin film 7 are removed.

Next, a film of a metal such as Al, Cu, Au, Ti, W, or Mo is deposited by sputtering, and patterning by using a resist as a mask is thereafter performed to form the electrode wirings 9. The electrode wiring 9 electrically connects the bolometer thin film 7 and the Read-out integrated circuit 2a in the circuit substrate 2 through the contacts 4 and serves as the supporting portion 13 that holds the bolometer thin film 7 in a hollow space.

Thereafter, silicon oxide film (SiO, $SiO_2$), silicon nitride film (SiN, $Si_3N_4$), silicon oxynitride film (SiON) or the like is deposited by plasma CVD to form the fourth protecting film 10 for protecting the electrode wirings 9.

Next, a film of a metal such as Al or Ti is deposited by sputtering, and patterning thereof by using a resist as a mask is thereafter performed to form the absorbing film 11. In the step, the metal film thickness is set so that the sheet resistance ($R_{sheet}$) of the temperature detecting portion 14 as a result of combining the second protecting film 6, the third protecting film 8, the bolometer thin film 7, the fourth protecting film 10 and the absorbing film 11 has a suitable value. The absorbing film 11 functions to efficiently absorb THz waves. The metal used therefor is not limited to Al and Ti. Any other material may suffice as the metal if it enables setting the sheet resistance ($R_{sheet}$) to a suitable value. While the absorbing film 11 is formed on the front surface of the temperature detecting portion 14 in the arrangement shown in FIG. 1, disposing the absorbing film 11 so that the absorbing film 11 is opposed to the reflective film 3 may suffice and the absorbing film 11 may be formed on the front surface or the back surface of the temperature detecting portion 14 or at an inner position in the temperature detecting portion 14.

Thereafter, the second protecting film 6, the third protecting film 8 and the fourth protecting film 10 are partially etched by plasma etching using a gas mixture of monofluoromethane and oxygen so that through holes are formed in predetermined regions on the sacrificial layer, thereby partially exposing polyimide. An ashing treatment using $O_2$ gas plasma is performed on the partially exposed polyimide to remove the sacrificial layer, thus completing the bolometer-type THz wave detector 1 having the micro-bridge structure in which the temperature detecting portion 14 is held by the supporting portion 13 so as to be raised from the circuit substrate 2.

In the above-described manufacturing process, the construction in which the first protecting film 5, the second protecting film 6, the bolometer thin film 7 and the third protecting film 8 are formed and the first protecting film 5, the second protecting film 6 and the third protecting film 8 on the contacts 4 are thereafter removed is selected. A different construction, e.g., one in which the first protecting film 5 on the contacts 4 is removed after forming the first protecting film 5, vias are formed in portions from which the protecting film 5 has been removed by embedding a metal in these portions using a CMP method or the like; the second protecting film 6, the bolometer thin film 7 and the third protecting film 8 are thereafter formed; and the second protecting film 6 and the third protecting film 8 on the vias are removed may alternatively be selected.

The sacrificial layer may be formed of polysilicon or Al used in place of polyimide. In a case where polysilicon is used, the sacrificial layer formed of polysilicon can be removed, for example, by using wet etching using hydrazine or tetramethylammonium hydroxide (TMAH), dry etching using $XeF_2$ plasma, or the like. In a case where Al is used, the sacrificial layer formed of Al can be removed, for example, by using wet etching using hydrochloric acid or hot phosphoric acid.

In a case where silicon oxide film is used as the second protecting film 6, the third protecting film 8 and the fourth protecting film 10, the sacrificial layer can be formed of silicon nitride film. The reverse selection is also possible. In a case where a sacrificial layer formed of silicon nitride film is provided, the sacrificial layer formed of silicon nitride film can be removed, for example, by using wet etching using hot phosphoric acid. In a case where a sacrificial layer formed of silicon oxide film is provided, the sacrificial layer formed of silicon oxide film can be removed, for example, by using wet etching using hydrofluoric acid.

Thus, in the first embodiment of the present invention in which the structure shown in FIG. 1 is employed, the film thickness ($t_{1st\text{-}protecting\text{-}film}$) of the first protecting film 5 is set so that the distance: $\Delta h_{air\text{-}gap}$ (air gap 15) between the upper surface of the first protecting film 5 and the lower surface of the temperature detecting portion 14 is smaller than 8 μm while the distance: $\Delta h_{gap}$ (gap 16) between the reflective film 3 and the absorbing film 11 is not changed, thereby enabling the high-performance bolometer-type THz wave detector 1 to be manufactured with an improved yield.

[Second Embodiment]

Figure 3:
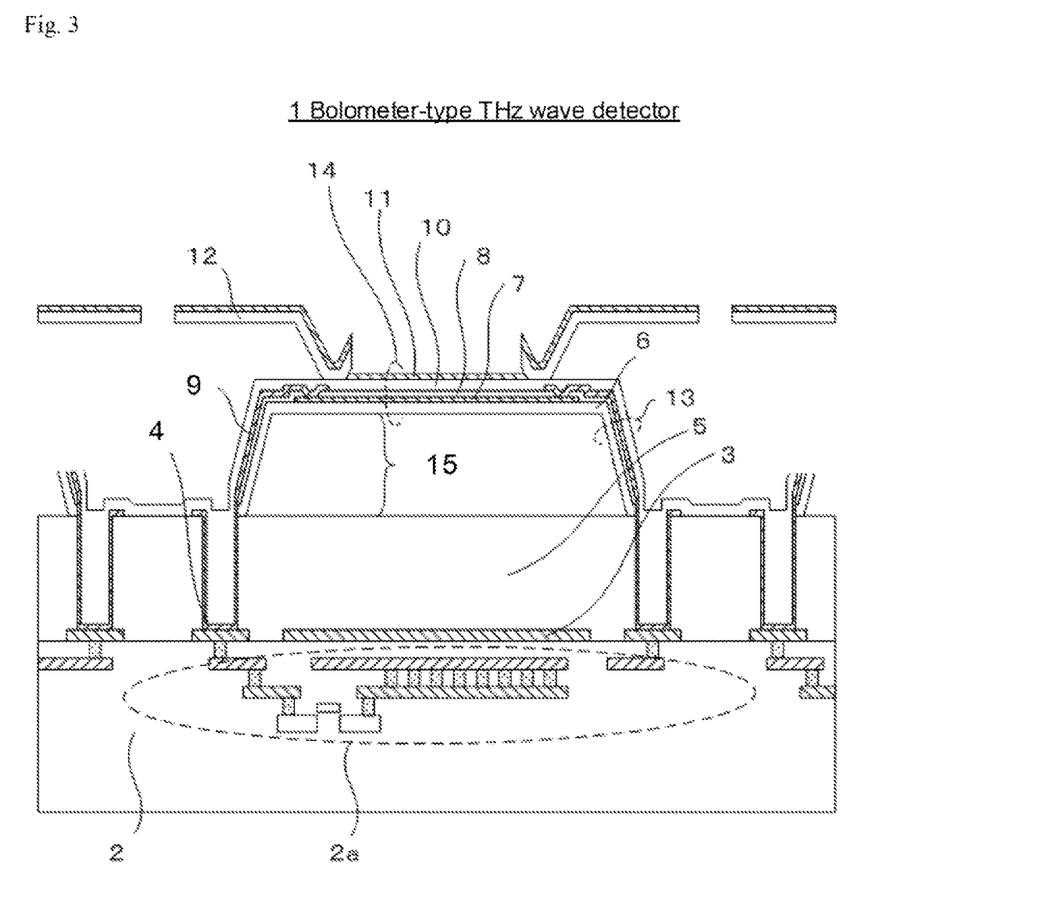
FIG. 3 is a sectional view schematically showing a pixel structure of a bolometer-type THz wave detector according to a second embodiment of the present invention.

A bolometer-type THz wave detector according to a second embodiment of the present invention will be explained with reference to FIG. 3. FIG. 3 is a cross section view showing a pixel structure of a bolometer-type THz wave detector according to the second embodiment of the present invention.

In the first embodiment of the present invention explained above in which the above-described structure as shown in FIG. 1 is employed, only the temperature detecting portion 14 formed of the second protecting film 6, the bolometer thin film 7, the third protecting film 8, the fourth protecting film 10 and the absorbing film 11 receives light of THz waves. On the other hand, in the second embodiment of the present invention, an Eave-like member extending from the periphery of the temperature detecting portion 14 to adjacent pixels is added for the purpose of increasing the light receiving area. FIG. 3 shows a pixel structure of a bolometer-type THz wave detector 1 according to the second embodiment of the present invention. The provision of an Eave-like member 12 enables absorption of THz waves incident around the periphery of the temperature detecting portion 14 to improve the sensitivity of the bolometer-type THz wave detector 1.

An example of a process for manufacturing the bolometer-type THz wave detector 1 having the structure as shown in FIG. 3 will be outlined.

First, as in the first embodiment of the present invention in which the structure as shown in FIG. 1 is employed, the reflective film 3 and the contacts 4 are formed on the circuit substrate 2 where the Read-out integrated circuit 2a, which is, for example, a CMOS circuit, is formed; the first protecting film 5 is formed on the reflective film 3 and the contacts 4; and a sacrificial layer is thereafter formed in the region where the temperature detecting portion 14 is to be formed. Next, the second protecting film 6, the bolometer thin film 7 and the third protecting film 8 are formed on the sacrificial layer, and the first protecting film 5, the second protecting film 6 and the third protecting film 8 on the contacts 4 and the third protecting film 8 on end portions of the bolometer thin film 7 are removed. Subsequently, the electrode wirings 9 and the fourth protecting film 10 are formed. The film thickness of the first protecting film 5 is set so that the gap 16 (the distance ($\Delta h_{gap}$) between the reflective film 3 and the absorbing film 11) has such a value that THz waves can be efficiently absorbed, and so that the air gap 15 (the distance by which the temperature detecting portion 14 is raised so that a hollow space is formed, i.e., the distance ($\Delta h_{air-gap}$) between the upper surface of the first protecting film 5 and the lower surface of the temperature detecting portion 14) is smaller than 8 μm.

Next, in the second embodiment of the present invention, the second protecting film 6, the third protecting film 8 and the fourth protecting film 10 are partially etched by plasma etching using a gas mixture of monofluoromethane and oxygen so that through holes are formed in predetermined regions on the sacrificial layer, thereby partially exposing polyimide.

Next, photosensitive polyimide is applied to the entire surface of the circuit substrate 2 and exposure and development are performed so that a peripheral portion of the temperature detecting portion 14 is exposed, followed by a heat treatment. A second sacrificial layer is thereby formed on a central portion of the temperature detecting portion 14 and in the region between the temperature detecting portions 14 adjacent to each other. The thickness of the second sacrificial layer formed on the central portion of the temperature detecting portion 14 is, for example, about 0.5 to 3 μm.

Next, an insulating material such as silicon oxide film (SiO, SiO$_2$), silicon nitride film (SiN, Si$_3$N$_4$), silicon oxynitride film (SiON) or the like is formed. The insulating material film is formed so as to cover the surface of the second sacrificial layer formed on the central portion of the temperature detecting portion 14 and in the region between the temperature detecting portions 14 adjacent to each other, and the surface of the fourth protecting film 10 exposed at the peripheral portion of the temperature detecting portion 14. Thereafter, the second sacrificial layer that is formed on the central portion of the temperature detecting portion 14 and the insulating material film formed on this second sacrificial layer are removed to expose the fourth protecting film 10 in the central portion of the temperature detecting portion 14. On the other hand, the Eave-like member 12 is formed by utilizing the insulating material film covering the surface of the second sacrificial layer that is formed in the region between the temperature detecting portions 14 adjacent to each other and the surface of the fourth protecting film 10 exposed at the peripheral portion of the temperature detecting portion 14.

Next, a film of a metal such as Al or Ti is formed by sputtering, and patterning thereof by using a resist as a mask is thereafter performed to form the absorbing film 11 on the fourth protecting film 10 in the central portion of the temperature detecting portion 14 and on the Eave-like member 12 formed in the region between the peripheral portion of the temperature detecting portion 14 and the adjacent temperature detecting portions 14. In the step, as in the first embodiment of the present invention, the metal film thickness is set so that the sheet resistance ($R_{sheet}$) of the temperature detecting portion 14 including the absorbing film 11 portion formed on the Eave-like member 12 in addition to the second protecting film 6, the third protecting film 8, the bolometer thin film 7, the fourth protecting film 10 and the absorbing film 11 has a suitable value. In the structure as shown in FIG. 3, the absorbing film 11 is also formed on the front surface of the Eave-like member 12 as well as on the fourth protecting film 10 in the central portion of the temperature detecting portion 14. Disposing the absorbing film 11 provided on the central portion of the temperature detecting portion 14 so that the absorbing film 11 is opposed to the reflective film 3 may suffice and the absorbing film 11 may be formed on the front surface or the back surface of the temperature detecting portion 14 or at an inner position in the temperature detecting portion 14. Also, a structure may alternatively be employed in which the portion of the absorbing film 11 formed on the surface of the peripheral Eave-like member 12 is formed on the back surface of the Eave-like member 12 or at an inner position in the Eave-like member 12 instead of being formed on the front surface of the Eave-like member 12.

Thereafter, through holes are formed in the Eave-like member 12 that is formed in the region between the temperature detecting portions 14 adjacent to each other to partially expose the polyimide constituting the second sacrificial layer. By using the through holes formed in advance in the predetermined regions on the sacrificial layer and the through holes formed in the Eave-like member 12, an ashing treatment using O$_2$ gas plasma is performed to remove the sacrificial layer and the second sacrificial layer. As a result, the bolometer-type THz wave detector 1 having the micro-bridge structure in which the temperature detecting portion 14 is held by the supporting portion 13 so as to be raised from the circuit substrate 2.

Thus, also in the second embodiment of the present invention in which the structure shown in FIG. 3 is adopted, the film thickness ($t_{1st\text{-}protecting\text{-}film}$) of the first protecting film 5 is set so that the distance: $\Delta h_{air\ gap}$ (air gap 15) between the upper surface of the first protecting film 5 and the lower surface of the temperature detecting portion 14 is smaller than 8 μm while the distance: $\Delta h_{gap}$ (gap 16) between the reflective film 3 and the absorbing film 11 provided on the central portion of the temperature detecting portion 14 is not changed, thereby enabling the high-performance bolometer-type THz wave detector 1 to be manufactured with an improved yield.

[Third Embodiment]

Figure 4:
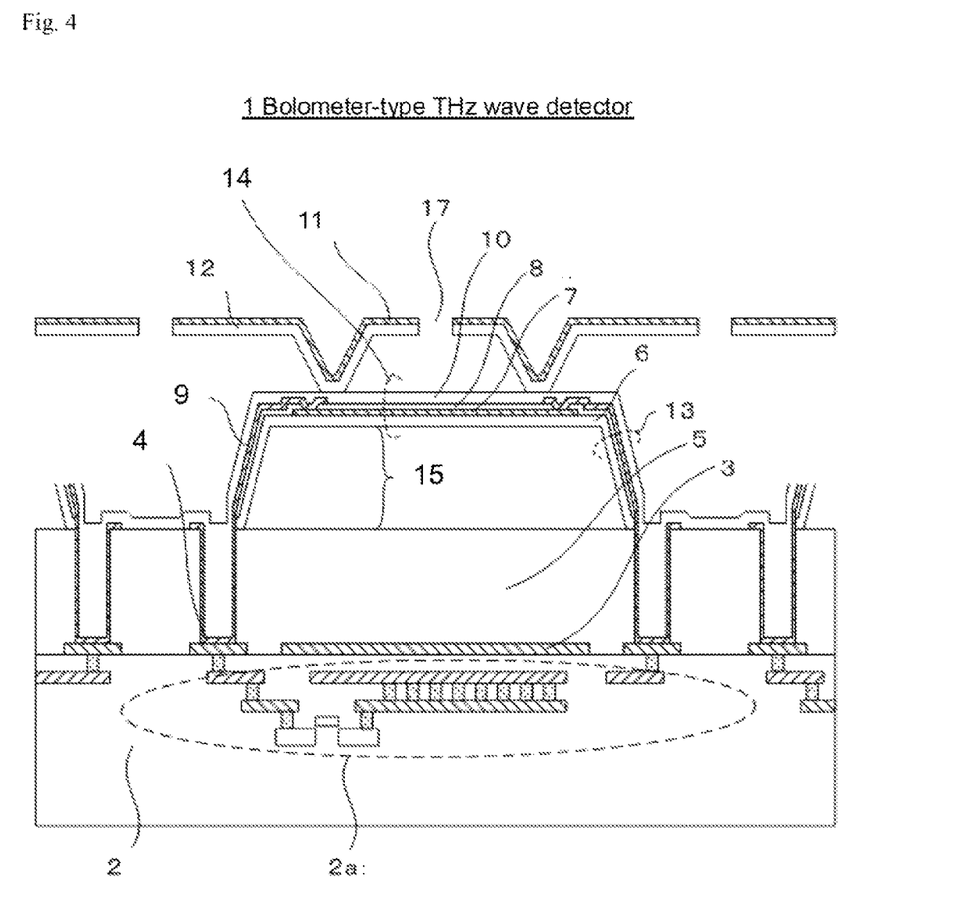
FIG. 4 is a sectional view schematically showing a pixel structure of a bolometer-type THz wave detector according to a third embodiment of the present invention.

A bolometer-type THz wave detector according to a third embodiment of the present invention will be described with reference to FIG. 4. FIG. 4 is a cross section view showing a pixel structure of a bolometer-type THz wave detector according to the third embodiment of the present invention.

In the second embodiment of the present invention in which the above-described structure as shown in FIG. 3 is employed, the gap (the distance ($\Delta h_{gap}$) between the reflective film 3 and the absorbing film 11) below the absorbing film 11 provided on the central portion of the temperature detecting portion 14 and the gap (the distance ($\Delta h_{gap}$) between the reflective film 3 and the absorbing film 11) below the absorbing film 11 formed on the front surface of the peripheral Eave-like member 12 are different from each other. For this reason, in the case where the value of the distance ($\Delta h_{gap}$) between the reflective film 3 and the absorbing film 11 provided on the central portion of the temperature detecting portion 14 at which the optical resonant structure is formed is selected, the interference effect is slightly reduced with respect to the absorbing film 11 formed on the front surface of the peripheral Eave-like member 12. In the third embodiment of the present invention, to improve this effect, the gap 16 is made generally uniform in each pixel, as shown in FIG. 4.

An example of a process for manufacturing the bolometer-type THz wave detector 1 having the structure as shown in FIG. 4 will be outlined.

First, as in the first embodiment of the present invention in which the structure as shown in FIG. 1 is adopted, the reflective film 3 and the contacts 4 are formed on the circuit substrate 2 in which the Read-out integrated circuit 2a, which is, for example, a CMOS circuit, is formed; the first protecting film 5 is formed on the reflective film 1 and the contacts 4; and a sacrificial layer is thereafter formed in the region where the temperature detecting portion 14 is to be formed. Next, the second protecting film 6, the bolometer thin film 7 and the third protecting film 8 are formed on the sacrificial layer, and the first protecting film 5, the second protecting film 6 and the third protecting film 8 on the contacts 4 and the third protecting film 8 on end portions of the bolometer thin film 7 are removed. Subsequently, the electrode wirings 9 and the fourth protecting film 10 are formed. The film thickness of the first protecting film 5 is set so that the gap 16 (the distance ($\Delta h_{gap}$) between the reflective film 3 and the absorbing film 11) has such a value that THz waves can be efficiently absorbed, and so that the air gap 15 (the distance by which the temperature detecting portion 14 is raised so that a hollow space is formed, i.e., the distance ($\Delta h_{air-gap}$) between the upper surface of the first protecting film 5 and the lower surface of the temperature detecting portion 14) is smaller than 8 µm.

Next, as in the second embodiment of the present invention in which the structure as shown in FIG. 3 is employed, the second protecting film 6, the third protecting film 8 and the fourth protecting film 10 are partially etched by plasma etching using a gas mixture of monofluoromethane and oxygen so that through holes are formed in predetermined regions on the sacrificial layer, thereby partially exposing polyimide. Next, photosensitive polyimide is applied to the entire surface of the circuit substrate 2 and exposure and development are performed so that a peripheral portion of the temperature detecting portion 14 is exposed, followed by a heat treatment. A second sacrificial layer is thereby formed on a central portion of the temperature detecting portion 14 and in the region between the temperature detecting portions 14 adjacent to each other. The thickness of the second sacrificial layer formed on the central portion of the temperature detecting portion 14 is, for example, about 0.5 to 3 µm.

Next, an insulating material such as silicon oxide film (SiO, $SiO_2$), silicon nitride film (SiN, $Si_3N_4$), silicon oxynitride film (SiON) or the like is formed. The insulating material film is formed so as to cover the surface of the second sacrificial layer formed on the central portion of the temperature detecting portion 14 and in the region between the temperature detecting portions 14 adjacent to each other, and the surface of the fourth protecting film 10 exposed at the peripheral portion of the temperature detecting portion 14. In the third embodiment of the present invention in which the structure as shown in FIG. 4 is employed, the insulating material film on a portion corresponding to a through hole 17 to be provided in the central portion of the temperature detecting portion 14 is removed after forming of the insulating material film. By using the insulating material film except for that on the portion corresponding to the through hole 17, the Eave-like member 12 is formed on the central portion of the temperature detecting portion 14 and in the region between the temperature detecting portions 14 adjacent to each other.

Next, a film of a metal such as Al or Ti is deposited by sputtering, and patterning thereof by using a resist as a mask is thereafter performed to form the absorbing film 11 on the central portion of the temperature detecting portion 14 and on the Eave-like member 12 formed in the region between the peripheral portion of the temperature detecting portion 14 and the adjacent temperature detecting portions 14 except on the portion corresponding to the through hole 17. Thereafter, through holes are formed in the Eave-like member 12 formed in the region between the peripheral portion of the temperature detecting portion 14 and the adjacent temperature detecting portions 14 to partially expose the polyimide constituting the second sacrificial layer. By using the through holes formed in advance in the predetermined regions on the sacrificial layer, the opening in the portion corresponding to the through hole 17 and the through holes formed in the Eave-like member 12, an ashing treatment using $O_2$ gas plasma is performed to remove the sacrificial layer and the second sacrificial layer. As a result, the bolometer-type THz wave detector 1 having the microbridge structure in which the temperature detecting portion 14 is held by the supporting portion 13 so as to be raised from the circuit substrate 2. In the construction as shown in FIG. 4, the absorbing film 11 is formed on the central portion of the temperature detecting portion 14 and on surface of the Eave-like member 12 formed in the region between the peripheral portion of the temperature detecting portion 14 and the adjacent temperature detecting portions 14. In forming the optical resonant structure of the reflective film and the absorbing film, disposing the absorbing film 11 so that the absorbing film 11 is opposed to the reflective film 3 may suffice and a structure may alternatively be employed in which the absorbing film 11 is formed on the central portion of the temperature detecting portion 14 and on the back surface of or in the Eave-like member 12 formed in the region between the peripheral portion of the temperature detecting portion 14 and the adjacent temperature detecting portions 14 instead of being formed on the front surface of the Eave-like member 12.

Thus, also in the third embodiment of the present invention in which the structure shown in FIG. 4 is adopted, the film thickness ($t_{1st-protecting-film}$) of the first protecting film 5 is set so that the distance: $\Delta h_{air-gap}$ (air gap 15) between the upper surface of the first protecting film 5 and the lower surface of the temperature detecting portion 14 is smaller than 8 µm while the distance: $\Delta h_{gap}$ (gap 16) between the reflective film 3 and the absorbing film 11 provided on the central portion of the temperature detecting portion 14 is not changed, thereby enabling the high-performance bolometer-type THz wave detector 1 to be manufactured with an improved yield.

[Fourth Embodiment]

Figure 5:
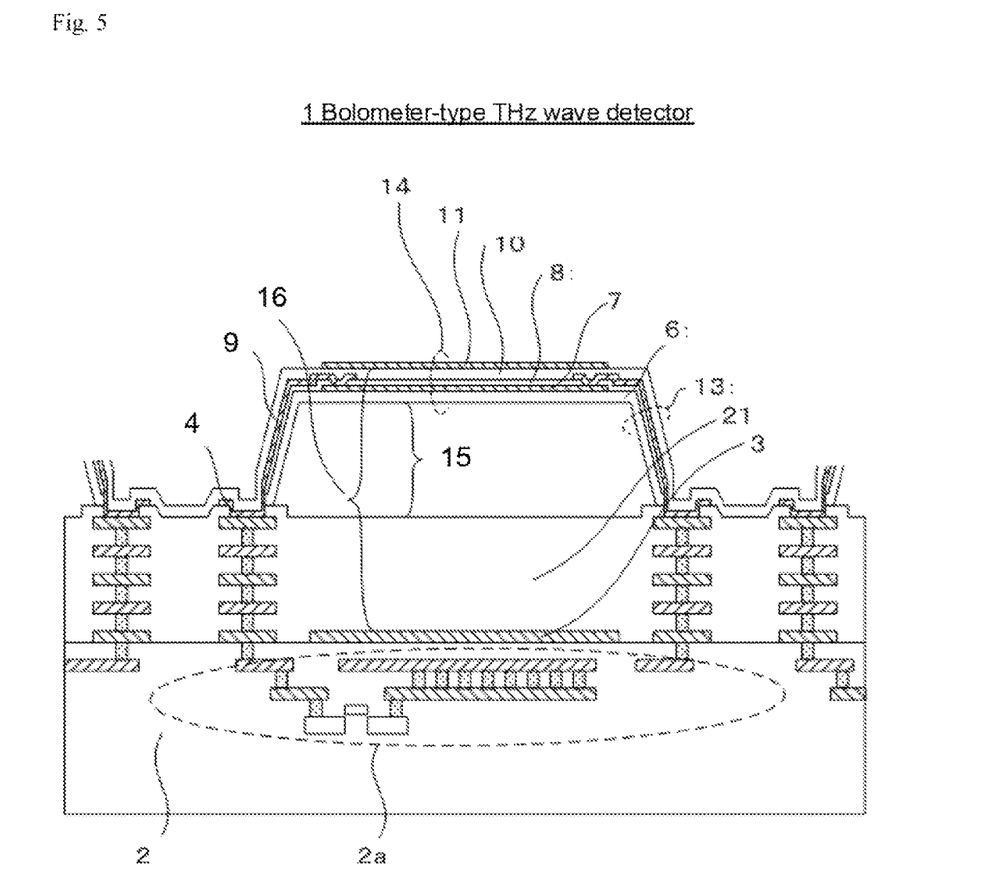
FIG. 5 is a sectional view schematically showing a pixel structure of a bolometer-type THz wave detector according to a fourth embodiment of the present invention.

A bolometer-type THz wave detector according to a fourth embodiment of the present invention will be described with reference to FIG. 5. FIG. 5 is a cross section view showing a pixel structure of a bolometer-type THz wave detector according to the fourth embodiment of the present invention.

In the first embodiment of the present invention in which the structure as shown in FIG. 1 is adopted, the thickness ($t_{1st-protecting-film}$) of the dielectric film (first protecting film 5) is increased in trading off for setting the air gap 15 ($\Delta h_{air-gap}$) smaller than 8 µm. As a result of increasing the film thickness ($t_{1st-protecting-film}$) of the first protecting film 5, the contacts 4 are made deeper and the possibility of breaking in the electrode wirings 9 is increased. In the fourth embodiment of the present invention, with a view to achieving an improvement in this respect, a multilayer wiring forming technique that is widely used in a semiconductor manufacturing process is utilized to form a multilayer wiring structure for connection of the electrode wiring 9 to the Read-out integrated circuit 2a by successively stacking vias and wiring layers on the wiring made by using the metal film used for making the reflective film 3, as shown in FIG. 5. The formed multilayer wiring structure is embedded in the interlayer dielectric film 21. The interlayer dielectric film 21 covering the surface of the reflective film 3 can be used as a dielectric film (first protecting film 5). Use of the interlayer dielectric film 21 covering the surface of the reflective film 3 in place of the dielectric film (first protecting film 5) enables the high-performance bolometer-type THz wave detector 1 to be manufactured with an improved yield. In addition, use of the multilayer wiring structure enables reducing the depth of the contacts 4 and limiting breaking of the electrode wiring 9. The multilayer wiring structure embedded in the interlayer dielectric film 21 is sufficiently realizable if the multilayer wiring forming technique that is widely used in recent semiconductor manufacturing processes is applied thereto.

[Fifth Embodiment]

Figure 6:
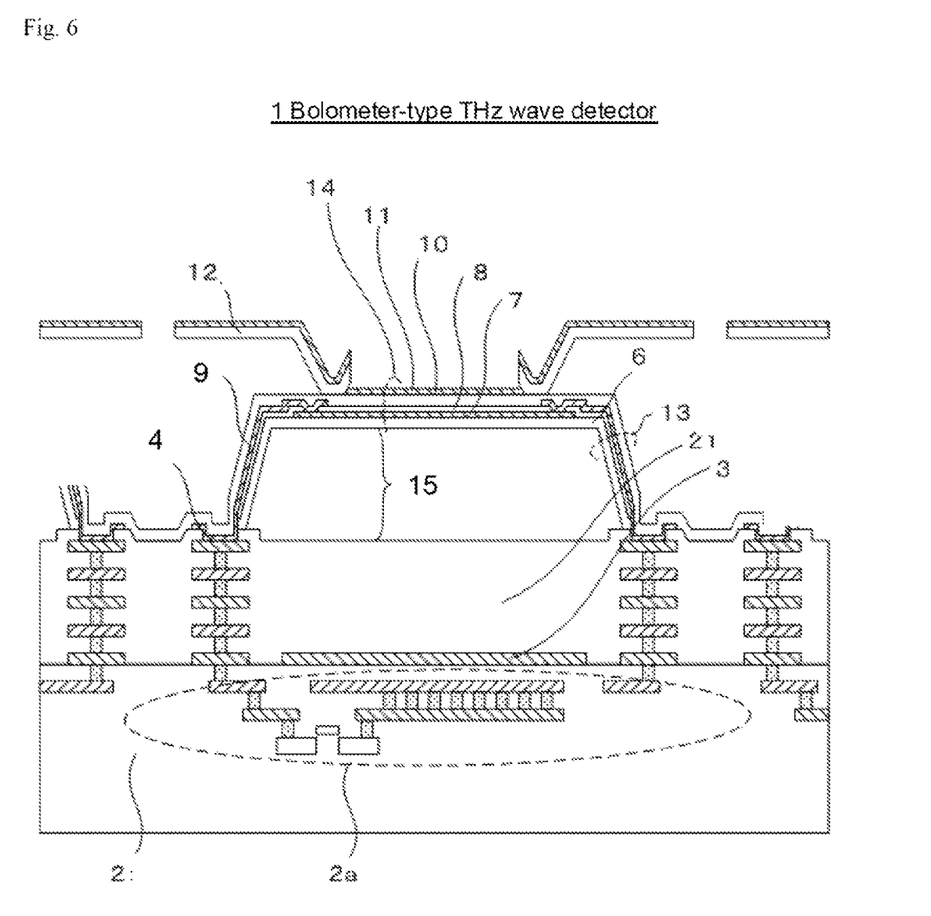
FIG. 6 is a sectional view schematically showing a pixel structure of a bolometer-type THz wave detector according to a fifth embodiment of the present invention.

A bolometer-type THz wave detector according to a fifth embodiment of the present invention will be described with reference to FIG. 6. FIG. 6 is a cross section view showing a pixel structure of a bolometer-type THz wave detector according to the fifth embodiment of the present invention. The structure as shown in FIG. 6 corresponds to a combination of the technique of providing the absorbing film 11 on the surface of the Eave-like member 12, employed in the second embodiment of the present invention, and the technique of applying the multilayer wiring structure embedded in the interlayer dielectric film 21, employed in the fourth embodiment of the present invention. Also in the fifth embodiment of the present invention using the structure as shown in FIG. 6, as well as in the fourth embodiment of the present invention, the high-performance bolometer-type THz wave detector 1 can be manufactured with an improved yield and breaking of the electrode wiring 9 can be prevented.

[Sixth Embodiment]

Figure 7:
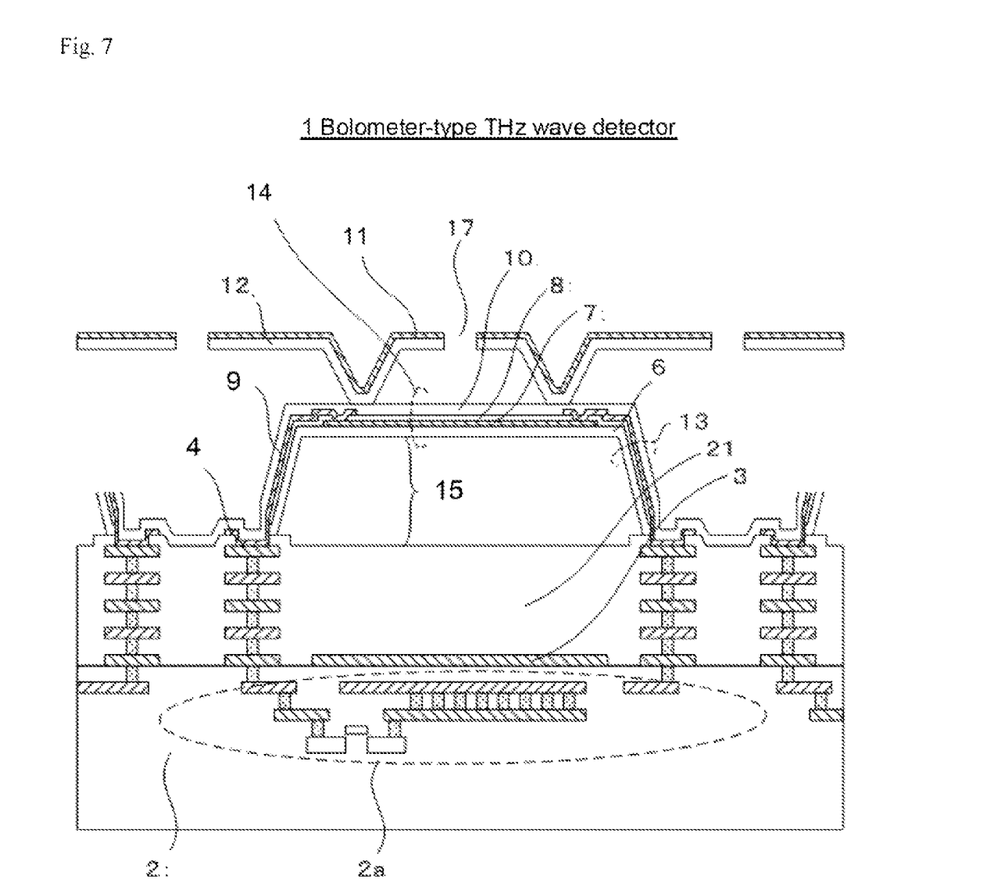
FIG. 7 is a sectional view schematically showing a pixel structure of a bolometer-type THz wave detector according to a sixth embodiment of the present invention.

A bolometer-type THz wave detector according to a sixth embodiment of the present invention will be described with reference to FIG. 7. FIG. 7 is a cross section view showing a pixel structure of a bolometer-type THz wave detector according to the sixth embodiment of the present invention. The structure as shown in FIG. 7 corresponds to a combination of the technique of providing the absorbing film 11 on the surface of the Eave-like member 12, employed in the third embodiment of the present invention, and the technique of applying the multilayer wiring structure embedded in the interlayer dielectric film 21, employed in the fourth embodiment of the present invention. Also in the sixth embodiment of the present invention using the structure as shown in FIG. 7, as well as in the fourth embodiment of the present invention, the high-performance bolometer-type THz wave detector 1 can be manufactured with an improved yield and breaking of the electrode wiring 9 can be prevented.

In the above description of the first to sixth embodiments, the technical concept (principle) of the present invention is explained with respect to a bolometer-type THz wave defector using the temperature detecting portion 14 having a bolometer thin film. The present invention is not limited to the bolometer-type THz wave detectors explained by way of example in the above description of the first to sixth embodiments. The concept of the present invention can be applied in the same way to any THz wave detector having an absorbing structure using optical interference. While the first to sixth embodiments have been explained with respect to a case where the present invention is applied to a bolometer-type THz wave detector that detects THz waves having a wavelength $\lambda$ of about 30 µm to 1 mm (1000 µm), the present invention is also applicable to a bolometer-type wave detector used for detection of electromagnetic waves of a longer wavelength.

The present invention has been illustrated with reference to embodiments (and exemplary modes) thereof. The scope of the present invention, however, is not limited to the illustrated embodiments (and exemplary modes). Various modifications and changes such as those understandable by those skilled in the art within the scope of the present invention can be made in the construction and details of the present invention.

This patent application is based upon and claims the benefit of priority from the prior Japanese Patent Application No. 2011-058693, filed on Mar. 17, 2011; the entire contents of which are incorporated herein by reference.

[Industrial Applicability]

The present invention can be applied to a detector that detects THz waves having a wavelength $\lambda$ of about 30 µm to 1 mm (1000 µm), particularly a bolometer-type THz wave detector.

The invention claimed is:

1. A bolometer-type THz wave detector having a thermal isolation structure in which a temperature detecting portion including a bolometer thin film that is connected to electrical wirings is supported in a state of being raised from a substrate by a supporting portion including the electrical wirings to be connected to a Read-out integrated circuit formed in the substrate, characterized in that:
    the wave detector comprising
    a reflective film for reflecting THz waves that is formed in such a position as to be opposed to the temperature detecting portion on the substrate,
    an absorbing film for absorbing the THz waves that is formed on the front surface or the back surface of the temperature detecting portion or at an inner position in the temperature detecting portion, whereby an optical resonant structure formed by the reflective film and the temperature detecting portion, and
    a film of dielectric transparent to the THz waves that is formed on the reflective film,
    wherein the film thickness of the dielectric is set so that the distance between an upper surface of the dielectric film and a lower surface of the temperature detecting portion is smaller than 8 µm.

2. The bolometer-type THz wave detector according to claim 1, further comprising an Eave-like member formed on the temperature detecting portion, the Eave-like member extending outwards from a peripheral portion of the temperature detecting portion,
    wherein the absorbing film is formed on the front surface or the back surface of the temperature detecting portion or at an inner position in the temperature detecting portion and on the front surface or the back surface of the Eave-like member or at an inner position in the Eave-like member.

3. The bolometer-type THz wave detector according to claim 2, wherein the Read-out integrated circuit and the electrical wiring are connected to each other by multilayer wirings which are formed in the dielectric film.

4. The bolometer-type THz wave detector according to claim 1, further comprising an Eave-like member formed on the temperature detecting portion, the Eave-like member extending inwards and outwards from a peripheral portion of the temperature detecting portion,
    wherein the absorbing film is formed on the front surface or the back surface of the Eave-like member or at an inner position in the Eave-like member.

5. The bolometer-type THz wave detector according to claim 4, wherein the Read-out integrated circuit and the electrical wiring are connected to each other by multilayer wiring formed in the dielectric film.

6. The bolometer-type THz wave detector according to claim 1,
    wherein the Read-out integrated circuit and the electrical wiring are connected to each other by multilayer wirings which are formed in the dielectric film.

* * * * *